(12) United States Patent
Duterque et al.

(10) Patent No.: US 9,467,519 B2
(45) Date of Patent: *Oct. 11, 2016

(54) METHODS AND APPARATUS TO IDENTIFY SESSION USERS WITH COOKIE INFORMATION

(71) Applicant: The Nielsen Company (US), LLC, New York, NY (US)

(72) Inventors: Gilles Duterque, San Francisco, CA (US); Seema Varma Srivastava, Sunnyvale, CA (US); Cristina Ion, Belmont, CA (US)

(73) Assignee: THE NIELSEN COMPANY (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/987,531

(22) Filed: Jan. 4, 2016

(65) Prior Publication Data

US 2016/0119433 A1   Apr. 28, 2016

Related U.S. Application Data

(63) Continuation of application No. 14/641,982, filed on Mar. 9, 2015, now Pat. No. 9,232,014, which is a continuation of application No. 13/396,071, filed on Feb. 14, 2012, now Pat. No. 9,015,255.

(51) Int. Cl.
*G06F 15/16* (2006.01)
*H04L 29/08* (2006.01)
(Continued)

(52) U.S. Cl.
CPC ......... *H04L 67/146* (2013.01); *G06Q 30/0201* (2013.01); *H04L 43/04* (2013.01); *H04L 67/22* (2013.01)

(58) Field of Classification Search
CPC .......... H04L 29/08621; H04L 67/146; H04L 67/22; H04L 43/04; G06F 21/6263
USPC ........................................................ 709/206
See application file for complete search history.

(56) References Cited

U.S. PATENT DOCUMENTS 3,540,003 A   11/1970   Murphy
3,818,458 A   6/1974   Deese
(Continued)

FOREIGN PATENT DOCUMENTS

AU   2013205736   5/2013
CN   1898662   1/2007
(Continued)

OTHER PUBLICATIONS

IP Australia, "Patent Examination Report No. 1," issued in connection with Australian Patent Application No. 2013204354, mailed Nov. 14, 2014, 3 pages.
(Continued)

*Primary Examiner* — Kevin Bates
*Assistant Examiner* — SM Rahman
(74) *Attorney, Agent, or Firm* — Hanley, Flight & Zimmerman, LLC

(57) ABSTRACT

Methods and apparatus are disclosed to identify session users with cookie information. An example method includes identifying a most recently used cookie based on a comparison of timestamps associated with a plurality of cookies, comparing an identifier of the most recently used cookie to a cookie table, the cookie table associating cookies with the plurality of different users, and when the identifier of the most recently used cookie is associated with one of the plurality of different users, associating subsequent usage activity of the computing device with the one of the plurality of different users.

20 Claims, 6 Drawing Sheets

(51) Int. Cl.
  *G06Q 30/02* (2012.01)
  *H04L 12/26* (2006.01)

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Wiedemer |
| 4,703,324 A | 10/1987 | White |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,182,770 A | 1/1993 | Medveczky et al. |
| 5,204,897 A | 4/1993 | Wyman |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Grube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,793,409 A | 8/1998 | Tetsumura |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 6,052,730 A | 4/2000 | Felciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,164,975 A | 12/2000 | Weingarden et al. |
| 6,223,215 B1 | 4/2001 | Hunt et al. |
| 6,247,050 B1 | 6/2001 | Tso et al. |
| 6,279,036 B1 | 8/2001 | Himmel et al. |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,159,023 B2 | 1/2007 | Tufts |
| 7,181,412 B1 | 2/2007 | Fulgoni et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,386,473 B2 | 6/2008 | Blumenau |
| 7,406,516 B2 | 7/2008 | Davis et al. |
| 7,526,538 B2 | 4/2009 | Wilson |
| 7,546,370 B1 | 6/2009 | Acharya et al. |
| 7,590,568 B2 | 9/2009 | Blumenau |
| 7,600,014 B2 | 10/2009 | Russell et al. |
| 7,613,635 B2 | 11/2009 | Blumenau |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,032,626 B1 | 10/2011 | Russell et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,229,780 B2 | 7/2012 | Davidow et al. |
| 8,234,408 B2 | 7/2012 | Jungck |
| 8,235,814 B2 | 8/2012 | Willis et al. |
| 8,266,687 B2 | 9/2012 | Baldry |
| 8,271,886 B2 | 9/2012 | Lee et al. |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,898,689 B2 | 11/2014 | Georgakis |
| 8,984,547 B2 | 3/2015 | Lambert et al. |
| 9,015,255 B2 | 4/2015 | Duterque et al. |
| 9,106,709 B2 | 8/2015 | Desilva et al. |
| 2003/0037131 A1 | 2/2003 | Verma |
| 2003/0046385 A1 | 3/2003 | Vincent |
| 2003/0065770 A1 | 4/2003 | Davis et al. |

(56) References Cited

U.S. PATENT DOCUMENTS

| | | |
|---|---|---|
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0044768 A1 | 3/2004 | Takahashi |
| 2004/0088212 A1 | 5/2004 | Hill |
| 2004/0098229 A1 | 5/2004 | Error et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0033657 A1 | 2/2005 | Herrington et al. |
| 2005/0166233 A1 | 7/2005 | Beyda et al. |
| 2006/0074953 A1 | 4/2006 | Dettinger et al. |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0091639 A1 | 4/2008 | Davis et al. |
| 2008/0126420 A1 | 5/2008 | Wright et al. |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0276179 A1 | 11/2008 | Borenstein et al. |
| 2008/0300965 A1 | 12/2008 | Doe |
| 2009/0030780 A1 | 1/2009 | York et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0292587 A1 | 11/2009 | Fitzgerald |
| 2010/0004977 A1 | 1/2010 | Marci et al. |
| 2010/0023999 A1* | 1/2010 | Schran ............... G06F 21/6263 726/1 |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2011/0087519 A1 | 4/2011 | Fordyce, III et al. |
| 2011/0087919 A1 | 4/2011 | Deshmukh et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0157475 A1 | 6/2011 | Wright et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246641 A1 | 10/2011 | Pugh et al. |
| 2011/0282997 A1 | 11/2011 | Prince et al. |
| 2011/0288907 A1 | 11/2011 | Harvey et al. |
| 2011/0295988 A1* | 12/2011 | Le Jouan ............... G06F 21/31 709/223 |
| 2012/0005213 A1 | 1/2012 | Hannan et al. |
| 2012/0030037 A1 | 2/2012 | Carriero |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0143713 A1 | 6/2012 | Dittus et al. |
| 2012/0151322 A1 | 6/2012 | Lindsay et al. |
| 2012/0158954 A1 | 6/2012 | Heffernan et al. |
| 2012/0166520 A1 | 6/2012 | Lindsay et al. |
| 2012/0185274 A1 | 7/2012 | Hu |
| 2012/0191815 A1* | 7/2012 | Tabbal ............... G06Q 30/0269 709/218 |
| 2012/0192214 A1 | 7/2012 | Hunn et al. |
| 2012/0215621 A1 | 8/2012 | Heffernan et al. |
| 2012/0239809 A1 | 9/2012 | Mazumdar et al. |
| 2012/0254466 A1 | 10/2012 | Jungck |
| 2012/0265606 A1 | 10/2012 | Patnode |
| 2013/0013308 A1 | 1/2013 | Cao et al. |
| 2013/0046615 A1 | 2/2013 | Liyanage |
| 2013/0066713 A1 | 3/2013 | Umeda |
| 2013/0097311 A1 | 4/2013 | Mazumdar et al. |
| 2013/0097312 A1 | 4/2013 | Mazumdar et al. |
| 2013/0138506 A1 | 5/2013 | Zhu et al. |
| 2013/0204694 A1 | 8/2013 | Banister et al. |
| 2013/0212188 A1 | 8/2013 | Duterque et al. |
| 2013/0212638 A1 | 8/2013 | Wilson |
| 2013/0246609 A1 | 9/2013 | Topchy et al. |
| 2013/0262181 A1 | 10/2013 | Topchy et al. |
| 2013/0282898 A1 | 10/2013 | Kalus et al. |
| 2013/0290070 A1 | 10/2013 | Abraham et al. |
| 2013/0331971 A1 | 12/2013 | Bida et al. |
| 2015/0046579 A1 | 2/2015 | Perez et al. |

FOREIGN PATENT DOCUMENTS

| | | |
|---|---|---|
| CN | 101536503 | 9/2009 |
| EP | 0325219 | 7/1989 |
| EP | 0703683 | 3/1996 |
| EP | 0744695 | 11/1996 |
| GB | 2176639 | 12/1986 |
| JP | H05324352 | 12/1993 |
| JP | 2002091852 | 3/2002 |
| JP | 2008234641 | 10/2008 |
| JP | 2010501939 | 1/2010 |
| KR | 20020037980 | 5/2002 |
| KR | 20110023293 | 3/2011 |
| WO | 9600950 | 1/1996 |
| WO | 9617467 | 6/1996 |
| WO | 9628904 | 9/1996 |
| WO | 9632815 | 10/1996 |
| WO | 9637983 | 11/1996 |
| WO | 9641495 | 12/1996 |
| WO | 0152168 | 7/2001 |
| WO | 0154034 | 7/2001 |
| WO | 2005013072 | 2/2005 |
| WO | 2008022339 | 2/2008 |
| WO | 2008150575 | 12/2008 |
| WO | 2011097624 | 8/2011 |
| WO | 2012040371 | 3/2012 |
| WO | 2012087954 | 6/2012 |
| WO | 2012128895 | 9/2012 |
| WO | 2013122907 | 8/2013 |
| WO | 2014059319 | 4/2014 |

OTHER PUBLICATIONS

Japanese Patent Office, "Notice of Reasons for Rejection," issued in connection with Japanese Patent Application No. P2015-078539 on Jul. 14, 2015, 6 pages.

United States Patent and Trademark Office, "Non-Final Office Action," issued in connection with U.S. Appl. No. 14/025,567, Aug. 6, 2015, 59 pages.

United State Patent and Trademark Office, "Final Office Action," issued in connection with U.S. Appl. No. 14/025,575, Aug. 17, 2015, 78 pages.

United State Patent and Trademark, "Non-Final Office Action," issued in connection with U.S. Appl. No. 14/463,309, Aug. 5, 2015, 62 pages.

United States Patent and Trademark Office, "Notice of Allowance," issued in connection with U.S. Appl. No. 14/641,982, mailed Sep. 2, 2015, 13 pages.

(56) References Cited

OTHER PUBLICATIONS

United States Patent and Trademark Office, "Supplemental Notice of Allowability," issued in connection with U.S. Appl. No. 14/641,982, mailed Sep. 23, 2015, 2 pages.
United States Patent and Trademark Office, "Supplemental Notice of Allowability," issued in connection with U.S. Appl. No. 14/641,982, mailed Oct. 9, 2015, 2 pages.
IP Australia,"Notice of Grant" issued in connection with Australian Patent Application No. 2011374955, mailed Dec. 17, 2015, 1 page.
The State Intellectual Property Office of China, "1st Office Action," issued in connection with Application No. 201310338209.4, mailed Dec. 22, 2015, 16 pages.
Canadian Patent Office, "Office Action," issued in connection with Canadian Patent Application No. 2,875,434, mailed Dec. 4, 2015, 4 pages.
Canadian Patent Office, "Office Action," issued in connection with Canadian Patent Application No. 2,875,437, mailed Dec. 4, 2015, 5 pages.
IP Australia, "Notice of Acceptance" issued in connection with Australian Patent Application No. 2014262739, mailed Oct. 30, 2015, 2 pages.
Japanese Patent Office, "Notice of Reasons for Rejection," issued in connection with Japanese Patent Application No. P2015-516283, mailed Jan. 19, 2016, 8 pages.
Japanese Patent Office, "Notice of Reasons for Rejection," issued in connection with Japanese Patent Application No. 2014-262891, mailed Jan. 12, 2016, 4 pages.
Rainier, "Why Businesses Should Use Google Plus," The Social Media Guide, retrieved from thesocialmediaguide.com/social_media/why-businesses-should-use-google-plus, retrieved on May 7, 2013 (9 pages).
International Bureau, "International Preliminary Report on Patentability," issued in connection with corresponding International Patent Application No. PCT/US2013/025687, mailed Aug. 28, 2014 (7 pages).
International Searching Authority, "International Search Report and Written Opinion," issued in connection with International Patent Application No. PCT/US2014/034389, mailed Sep. 5, 2014 (15 pages).
International Searching Authority, "International Search Report and Written Opinion," issued in connection with International Patent Application No. PCT/US2014/035683, mailed Sep. 12, 2014 (13 pages).
International Searching Authority, "International Search Report and Written Opinion," issued in connection with International Patent Application No. PCT/US2014/037064, mailed Sep. 12, 2014 (9 pages).
Albanesius, "Facebook Issues Fix for Several Tracking Cookies," PCMag.com, Sep. 28, 2011, retrieved from <http://www.pcmag.com/article/print/288362>, retrieved on Oct. 26, 2011 (1 page).
Protalinski, "Facebook Denies Cookie Tracking Allegations," ZDNet, Sep. 25, 2011, retrieved from <http://www.zdnet.com/blg/facebook/facebook-denies-cookie-tracking-allegations>, retrieved on Oct. 26, 2011 (2 pages).
Protalinski, "Facebook Fixes Cookie Behavior After Logging Out," ZDNet, Sep. 27, 2011, retrieved from <http://www.zdnet.com/blog/facebook/facebook-fixes-cookie-behavior-after-logging-out>, retrieved on Oct. 26, 2011 (2 pages).
Protalinski, "US Congressmen Ask FTC to Investigate Facebook Cookies," ZDNet, Sep. 28, 2011, retrieved from <http://www.zdnet.com/blog/facebook/us-congressmen-ask-ftc-to-investigate-facebook-cookies>, retrieved on Oct. 26, 2011 (2 pages).
International Searching Authority, "International Search Report," issued in connection with International Patent Application No. PCT/US2013/025687, mailed Jun. 2, 2013 (5 pages).
International Searching Authority, "Written Opinion," issued in connection with International Patent Application No. PCT/US2013/025687 on Jun. 2, 2013 (5 pages).
Cubrilovic, "Logging Out of Facebook is Not Enough," New Web Order-Nik Cubrilovic Blog, Sep. 25, 2011, retrieved from <http://nikcub.appspot.com/logging-out-of-facebook-is-not-enough>, retrieved on Oct. 26, 2011 (42 pages).
United States Patent and Trademark Office, "Non-Final Office Action," issued in connection with U.S. Appl. No. 13/396,071, mailed May 9, 2014 (14 pages).
United States Patent and Trademark Office, "Notice of Allowance," issued in connection with U.S. Appl. No. 13/396,071, mailed Oct. 24, 2014 (8 pages).
IP Australia, "Patent Examination Report No. 1," issued in connection with Australian Patent Application No. 2013204354, mailed Nov. 14, 2014 (3 pages).
United States Patent and Trademark Office, "Notice of Allowability," issued in connection with U.S. Appl. No. 13/396,071, mailed Feb. 2, 2015 (2 pages).
United States Patent and Trademark Office, "Notice of Allowability," issued in connection with U.S. Appl. No. 13/396,071, mailed Mar. 23, 2015 (2 pages).
European Patent Office, "Extended European Search Report," issued in connection with application No. EP 14004028.8, on Apr. 9, 2015 (7 pages).
United States Patent and Trademark Office, "Non-Final Office Action," issued in connection with U.S. Appl. No. 14/025,575, Apr. 16, 2015 (72 pages).
The State Intellectual Property Office of China, "First Notification of Office Action," issued in connection with application No. CN 201280003504.8, on Apr. 1, 2015, with English translation (17 pages).
IP Australia, "Patent Examination Report No. 1," issued in connection with Application No. 2014260163, Apr. 21, 2015 (3 pages).
United States Patent and Trademark Office, "Notice of Allowance," issued in connection with U.S. Appl. No. 14/500,297, May 21, 2015 (31 pages).
IP Australia, "Notice of Acceptance" issued in connection with Application No. 2012231667, May 15, 2015 (3 pages).
United States Patent and Trademark Office, "Non-Final Office Action," issued in connection with U.S. Appl. No. 14/014,050, May 28, 2015 (20 pages).
Japanese Patent Office, "Notice of Allowance" with English translation, issued in connection with application No. JP 2013-544887, on May 27, 2015 (5 pages).
United States Patent and Trademark Office, "Notice of Allowance," issued in connection with U.S. Appl. No. 13/690,915, on Jun. 24, 2014 (6 pages).
United States Patent and Trademark Office, "Supplemental Notice of Allowability," issued in connection with U.S. Appl. No. 13/690,915, on Jul. 8, 2014 (3 pages).
United States Patent and Trademark Office, "Corrected Notice of Allowability," issued in connection with U.S. Appl. No. 13/690,915, on Nov. 6, 2014 (2 pages).
IP Australia, "Patent Examination Report No. 1," issued in connection with Application No. 2014262739, May 29, 2015 (4 pages).
United States Patent and Trademark Office, "Notice of Allowance," issued in connection with U.S. Appl. No. 13/915,381, Jun. 8, 2015 (44 pages).
United States Patent and Trademark Office, "Non-Final Office Action," issued in connection with U.S. Appl. No. 13/404,984, May 20, 2015 (27 pages).
United States Patent and Trademark Office, "Notice of Allowance," issued in connection with U.S. Appl. No. 13/690,915, mailed Jun. 5, 2015 (64 pages).
Japanese Patent Office, "Notice of Allowance," issued in connection with Japanese Patent Application No. 2014-005867 mailed Jun. 9, 2015 (3 pages).
IP Australia, "Patent Examination Report No. 1," issued in connection with Application No. 2011349435, mailed Nov. 4, 2014 (3 pages).
Japanese Patent Office, "Notice of Allowance," issued in connection with Japanese Patent Application No. 2013-546286 mailed Mar. 10, 2015 (6 pages).
Japanese Patent Office, "Office Action," issued in connection with Japanese Patent Application No. 2013-546286, mailed Aug. 26, 2014 (5 pages).

(56) References Cited

OTHER PUBLICATIONS

United States Patent and Trademark Office, "Notice of Allowance," issued in connection with U.S. Appl. No. 13/995,864, mailed Oct. 28, 2014 (39 pages).

Goerg et al., "How Many Millenials Visit YouTube? Estimating Unobserved Events From Incomplete Panel Data Conditioned on Demographic Covariates," Google, Inc., Apr. 27, 2015 (27 pages).

Goerg et al., "How Many People Visit YouTube? Imputing Missing Events in Panels With Excess Zeros," Google Inc., 2015 (6 pages).

United States Patent and Trademark Office, "Non-Final Office Action," issued in connection with U.S. Appl. No. 14/014,044, mailed Jul. 2, 2015 (69 pages).

IP Australia, "Notice of Acceptance," issued in connection with Application No. 2013204865, mailed Jun. 30, 2015 (2 pages).

IP Australia, "Notice of Acceptance," issued in connection with Application No. 2013203898, mailed Jun. 17, 2015 (2 pages).

IP Australia, "Notice of Acceptance," issued in connection with Application No. 2011305429, mailed Jul. 15, 2015 (2 pages).

\* cited by examiner

300

| HOUSEHOLD USER (302) | COOKIE DOMAIN/ TAG (304) | SERVICE ID (306) |
| --- | --- | --- |
| John | Facebook (c_user) | 4145426609 |
| John | E-mail (xyz) | 3239533200 |
| John | Social #2 (tuv) | 9205697500 |
| Jan | E-mail (xyz) | 3234796162 |
| Mary | Facebook (c_user) | 4932915678 |
| Mary | E-mail (xyz) | 7732025862 |
| Mary | Social #2 (tuv) | 7734042827 |

FIG. 3

METHODS AND APPARATUS TO IDENTIFY SESSION USERS WITH COOKIE INFORMATION

RELATED APPLICATION

This patent arises from a continuation of U.S. patent application Ser. No. 14/641,982, filed on Mar. 9, 2015, issued as U.S. Pat. No. 9,232,014, on Jan. 5, 2015, which is a continuation of U.S. patent application Ser. No. 13/396,071, filed on Feb. 14, 2012, issued as U.S. Pat. No. 9,015,255, on Apr. 21, 2015, both U.S. patent application Ser. No. 14/641,982 and U.S. patent application Ser. No. 13/396,071 are hereby incorporated herein by reference in their entirety.

FIELD OF THE DISCLOSURE

This disclosure relates generally to audience measurement, and, more particularly, to methods and apparatus to identify session users with cookie information.

BACKGROUND

Establishment of demographically selected household panelists allows market researchers an opportunity to collect behavior data of an audience and to project the occurrence of one or more such behaviors to a larger population. Household panelist data allows statistically significant projections that correspond to various types of consumer behavior including, but not limited to television exposure behavior, shopping behavior, Internet browsing behaviors, and/or behavior related to computing device interaction.

BRIEF DESCRIPTION OF THE DRAWINGS

FIG. 3 is an example table generated by the example cookie user identifier of FIG. 2.

DETAILED DESCRIPTION

Figure 1:
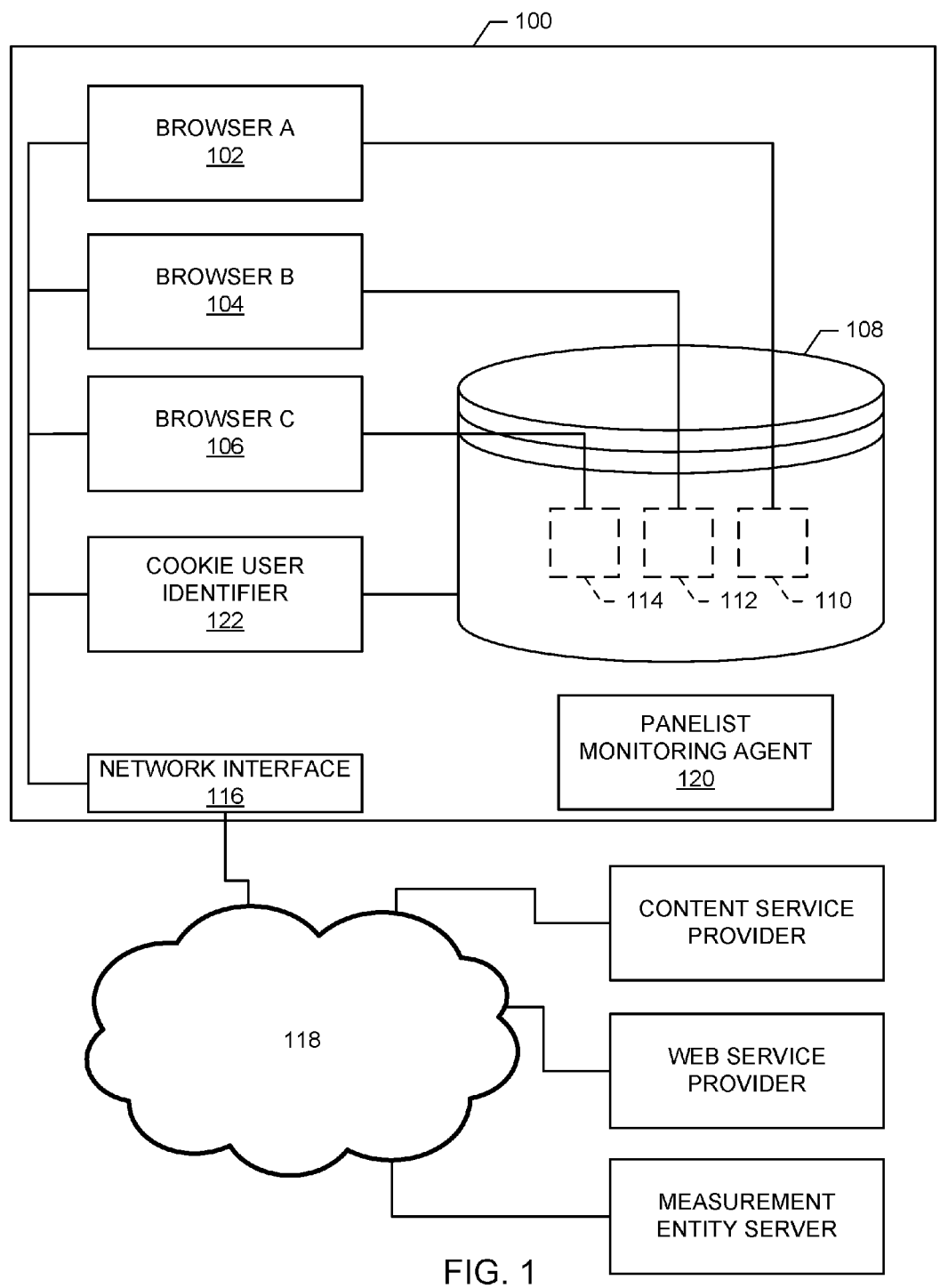
FIG. 1 is a schematic illustration of an example computing device constructed in accordance with the teachings of this disclosure to identify session users with cookie information.

Methods and apparatus are disclosed to identify session users with cookie information. An example method includes identifying activity associated with a first cookie having a first type, in response to identifying the first, parsing the first cookie to identify a first panelist, when the first cookie includes an identifier associated with a first panelist, associating current usage activity of the computing device with the first panelist, and when the first cookie includes an identifier unassociated with the first panelist, associating current usage activity of the computing device with a guest Audience measurement companies enlist persons and/or groups of persons (e.g., households) as panelists. To become a panelist, such persons typically undergo a registration process in which they provide their demographic information to the audience measurement company. Often, the audience measurement entity will assign an identifier to the person to enable collected data to be mapped to the demographics of the panelist corresponding to the user. The audience measurement company will typically also provide the panelist with one or more software and/or hardware metering devices to collect media exposure data. The precise type(s) of metering device(s) may vary depending on one or more of the type of information being collected, the type of device(s) being monitored, the environment(s) in which the panelist is to be monitored, and/or the type(s) of media (e.g., radio, television, Internet, etc) exposure and/or behavior(s) to be monitored. In some applications, the panelist is provided with a first meter to identify the members of an audience (e.g., a people meter) and a second meter to collect data identifying or enabling identification of the media to which the panelist is exposed. The audience measurement company may deliver and/or install such meters in the panelist's home and/or on the panelist's media delivery equipment (e.g., computer, television, set top box, etc). Alternatively, the panelist may be provided with the metering software and/or hardware via an automated installation (e.g., via a download over the Internet) and/or the panelist may be asked to perform some or all of the installation.

During a study, panelists may receive reminders and/or prompts to identify themselves. In some examples, a panelist that agrees to have their television behavior monitored is provided buttons or other inputs (sometimes referred to as a people meter) that allows the viewer to select their name in response to a prompt to self-identify. Viewing information, such as current channel, current time and/or viewing duration of the viewer is associated with the household individual identified via the metering device (e.g., a PeopleMeter device associated with The Nielsen Company®).

In other examples, panelists may agree to allow their computing device behavior to be monitored. Computing device monitoring may include collecting data reflecting browsing behavior, access to Internet resources, purchasing of products, etc., to enable analysis of on-line consumer behavior, trend development, advertising effectiveness assessment, brand advocacy assessment, and/or social media buzz to better understand how consumers engage with various online media. Panelist households may include one or more computing devices, such as desktop personal computers, laptops, netbooks, personal digital assistants, mobile phones and/or tablets (e.g., iPADs). The computing device(s) may be centrally located and/or otherwise located in one or more areas of the household that result in shared use between household members. A panelist and/or a household of panelists (e.g., family members, roommates, etc.) that agree to have their computing device usage monitored may be presented with an on-screen prompt to identify which user is interacting with the computing device. However, participation by panelists may be discouraged and/or reduced when one or more techniques to prompt for identification become burdensome and/or are perceived to be invasive.

Even when a household panelist provides an indication of their identity prior to using a household computing device (e.g., by selecting their name on an on-screen prompt), the panelist may leave the computing device and a different household user (e.g., another panelist of the same household) may begin to use it without providing any indication of the change in users. In such example circumstances, logging information about computer usage behavior (e.g., web sites visited, on-line purchasing, bill payment activity, etc.) results in one or more inaccurate datasets as the activity is attributed to the wrong panelist. For example, if household panelist "John" responds to an on-screen identification prompt of a shared computing device (e.g., an Apple iPad®) located in the household, then subsequent usage of that computing device is recorded (e.g., by a monitoring program operating on the computing device), and forwarded to a monitoring organization (e.g., The Nielsen Company®) as associated with the household panelist "John." John has a particular demographic profile (e.g., age, income, etc.). In the event another user (which may or may not be a household panelist) subsequently begins using the computing device after John without another logon event identifying the user change, then the subsequently recorded behavior will be skewed and/or otherwise erroneous if the second panelist has different demographic characteristics than the first user, John (e.g., a different age, a different gender, a different income, etc.).

Example methods, apparatus, systems and/or articles of manufacture disclosed herein passively identify a current user of a computing device in an environment where more than one individual is expected to use the same computing device. Activities typically performed by users of computing devices include checking social networking status information and/or checking for the presence of electronic mail (e-mail) messages. Web-based e-mail and/or social networking services often use cookies (e.g., a numeric and/or alphanumeric identifier) to identify users. Each cookie is unique to a particular user of the service. Additionally, the cookies employed by such web-based services may persist on the computing device (e.g., in the cache, on the hard drive, etc.) after a user closes (e.g., shuts-down) a browser and/or turns off the computing device. As a result, when the user re-opens their web browser and navigates to a web address (e.g., a uniform resource locator (URL) associated with the web service, such as www.facebook.com), the web service may still access a persistent cookie to allow the web service to configure its services in a manner that tailors to one or more preferences of the user, and/or to allow the user to access the web service without manually entering authentication credentials again.

Participation with social networking services and/or e-mail services is a computing device activity associated with relatively high reach when compared to other computing device activities (e.g., gaming). For example, sixty to seventy percent of computing device sessions in the U.S. are believed to include access to the social networking service named Facebook®. Example methods, apparatus, systems and/or articles of manufacture disclosed herein access cookies stored on and/or transferred by a computing device to determine an identity of the current user in a non-invasive manner (i.e., without requiring another prompt of the user).

FIG. 1 is a schematic illustration of an example computing device 100 that may be used by any number of household panelists. In the illustrated example of FIG. 1, the computing device 100 includes a first browser ("Browser A") 102, a second browser ("Browser B") 104, and a third browser 106 ("Browser C") 106. Each of the example first, second and third browsers (102, 104, 106) may be designed and/or otherwise developed by different entities that distribute browsers. Example browsers include, but are not limited to, Microsoft® Internet Explorer®, Mozilla Firefox®, Apple® Safari®, Android®, Google® Chrome® and Opera®.

The example computing device 100 of FIG. 1 includes a platform memory 108, such as a hard drive, a solid state memory and/or any other type of memory. The platform memory 108 is able to store cookies received via any of the first, second and third example browsers (102, 104, 106). Each web browser stores cookies from user sessions in a unique directory of the platform memory 108. Cookies are not shared and/or otherwise viewed by foreign browsers. In other words, each browser manages and views only those cookies that result from their corresponding web sessions. In the illustrated example of FIG. 1, the platform memory 108 includes a first browser cookie directory 110, a second browser cookie directory 112 and a third browser cookie directory 114 to store cookies for each of the first, second and third browsers (102, 104, 106), respectively. Each of the first, second and third browsers (102, 104, 106) are communicatively connected (e.g., via a wired or wireless connection) to an example network interface 116 to facilitate communication to one or more network(s) 118, such as one or more intranets and/or the Internet.

Panelists that agree to have their computing device behavior monitored may also agree to have one or more monitoring devices and/or programs installed on their computing devices. In the illustrated example of FIG. 1, the computing device 100 includes a panelist monitoring agent 120 to monitor and record interaction between household panelists and the computing device 100. While the illustrated example of FIG. 1 shows panelist monitoring techniques by way of the panelist monitoring agent 120 (e.g., a software-based monitoring program executed by a processor of the computing device 100), the techniques to monitor user behavior are not limited thereto. For instance, in some examples, the panelist household may be monitored via one or more routers of the household to identify what websites are visited and/or websites may be tagged with monitoring instructions that cause the browser 102, 104, 106 to send a message (e.g., an HTML request) to the audience measurement entity to enable the audience measurement entity to log the access to the web page. As described in further detail below, the example computing device 100 of FIG. 1 also includes an example cookie user identifier 122 to facilitate identification of users with cookie information.

Figure 2:
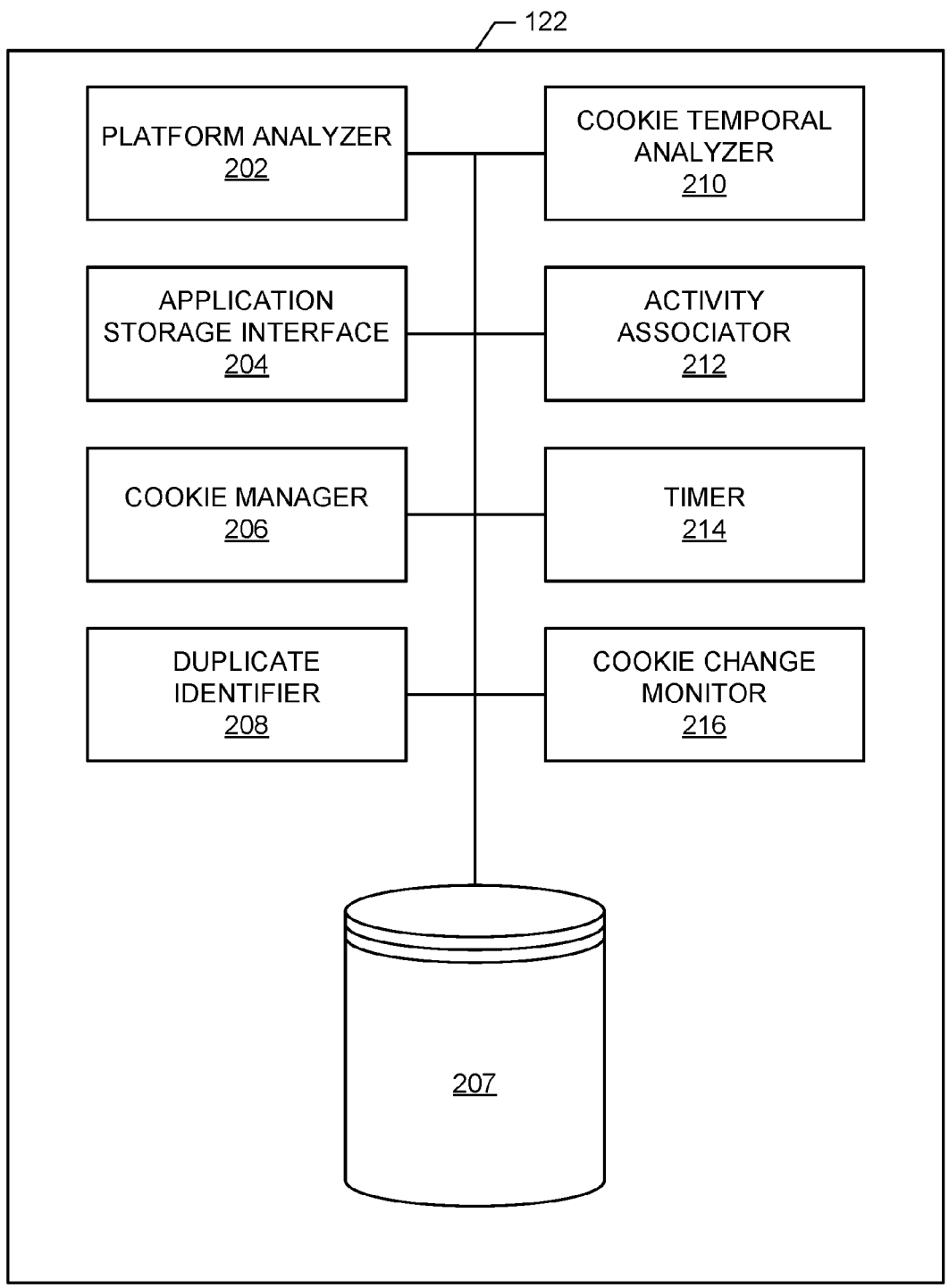
FIG. 2 is a schematic illustration of an example implementation of the cookie user identifier of FIG. 1.

FIG. 2 is a schematic illustration of an example implementation of the cookie user identifier 122 of FIG. 1. In the illustrated example of FIG. 2, the cookie user identifier 122 includes a platform analyzer 202, an application storage interface 204, a persistent cookie manager 206, a duplicate identifier 208, a cookie temporal analyzer 210, an activity associator 212, a timer 214 and a persistent cookie change monitor 216. In operation, the example platform analyzer 202 scans and/or otherwise searches the computing device 100 for programs and/or applications associated with browsing functionality. In some examples, the platform analyzer 202 may search a registry and/or program listing of the computing device 100 for particular installed programs and/or applications. The example persistent cookie manager 206 invokes the example application storage interface 204 to identify a persistent cookie stored in the example platform memory 108. For each browser program and/or browser application identified by the example platform analyzer 202, the example application storage interface 204 locates corresponding storage location(s) of cookies for that browser.

In some examples, the persistent cookie manager 206 identifies these locations by searching for cookie directories in the platform memory. In the illustrated example, the application storage interface identifies the first browser cookie directory 110, the second browser cookie directory 112 and/or the third browser cookie directory 114 to search for one or more types of cookies. The application storage interface 204 looks for known cookie tag formats. Web services often employ cookie tag nomenclature that is indicative of a particular web service. For example, the cookie tag "c_user" is associated with Facebook®. If a known web service cookie tag is identified by the example persistent cookie manager 206, then an associated panelist user identity is identified, if any. For example, the first time a panelist participates with one or more known web services, the monitoring entity may cultivate information associated with the current user to associate the panelist and/or panelist information with the known web service. At the initial time of association between the current user (current panelist) and the web-service, unique identifiers are associated with the panelist, such as the unique "c_user" cookie identifier for each user of the Facebook® web-service. While the illustrated examples disclosed herein include the c_user cookie tag employed by Facebook®, example methods, apparatus, systems and/or articles of manufacture disclosed herein are not limited thereto. For example, other web services may employ additional and/or alternate cookie tags that operate in a similar manner as the c_user cookie tag.

The c_user cookie tag employed by Facebook® includes an associated numeric value that is unique to each user of the Facebook® web services. Each time a Facebook® user logs on to a computing device for any browser type, the c_user cookie tag is populated with an identifier unique to that user. If the user explicitly logs-off from the Facebook® website (e.g., by clicking a "log-off" icon from the Facebook® interface), then the c_user cookie and its corresponding identification information is destroyed and/or otherwise removed from the computing device. In the event the user logs onto the Facebook® web services using an alternate browser and/or a different computing device, the same identification value is populated with the c_user cookie tag on that alternate browser and/or different computing device. However, if the user closes the browser without explicitly logging off from the Facebook® interface, then the c_user cookie and its corresponding identification information persist on the computing device. In particular, the c_user cookie remains stored in the particular memory location of the example platform memory 108 location associated with the browser that was used by that user to obtain the cookie.

If a second user of the example computing device 100 logs onto Facebook® using the same browser that was used by the prior Facebook® user, then the previously stored c_user cookie is replaced with information associated with the second user (e.g., in the first browser cookie directory 110). However, when the second user of the example computing device 100 logs onto Facebook® using an alternate browser, then a new c_user cookie is stored in the memory directory associated with the alternate browser (e.g., the second browser cookie directory 112), and the previously stored c_user cookie associated with the previously used browser (e.g., the first browser cookie directory 110) is unaffected.

The example cookie manager 206 of FIG. 2 generates, updates and/or otherwise manages a cookie table to track associations between cookies and household panelists. Turning to FIG. 3, a cookie table 300 includes a household user column 302, a cookie domain column 304, and a service identifier (ID) column 306. For each household member (e.g., members "John," "Jan," and "Mary") a corresponding cookie domain and service ID is listed for web services used by the household member. In the illustrated example, each of the web-based services uses one or more cookie tag(s) having a nomenclature unique to that service. For example, Facebook® uses a cookie tag labeled "c_user," while other web-based services may employ any other names for their associated cookie(s). Known cookie tag nomenclature may be stored in the example cookie database 207 to facilitate queries and/or look-up operations of cookies stored in the example platform memory 108 by one or more browsers. To stay current with additional and/or alternate cookies and/or corresponding cookie tag nomenclature, the example cookie user identifier 122 may access one or more server(s) via the example network interface 116 to access information related to web-based services and/or corresponding tag nomenclature.

In the illustrated example of FIG. 3, panelist members John and Mary each participate with Facebook®, an e-mail service, and a second social web-based service labeled "Social #2" (e.g., Twitter®, Blogster®, deviantART®, Epernicus®, Flickr®, Foursquare®, Google+®, etc.). On the other hand, Jan only participates in a web-based service associated with an e-mail service provider. In the event that Jan joins one or more additional and/or alternate web-based services in the future, the example cookie manager 206 will add additional row(s) of information thereto. In the example of FIG. 3, household user John, for example, is presently associated with a Facebook® cookie (e.g., as evidenced by the cookie nomenclature "c_user") and a corresponding service identifier "4145426609." In the example of FIG. 3, household user John is also presently associated with an e-mail service (e.g., as evidenced by the cookie nomenclature "xyz") and a corresponding service identifier "3239533200," and is associated with another social networking service (e.g., as evidenced by the cookie nomenclature "tuv") and a corresponding service identifier "9205697500." In the example of FIG. 3, example household user Mary is also associated with a Facebook® cookie (e.g., as evidenced by the cookie nomenclature "c_user") and a corresponding service identifier "4932915678."

As described above, security mechanisms prevent one browser from having access to the cookies associated with another browser. Additionally, security mechanisms prevent one web service (e.g., domain) from being able to access cookies associated with another web service (e.g., a second web service domain). However, the example panelist monitoring agent 120 has full access to the resources of the example computing device 100 by virtue of panelist consent and, thus, may access all content generated and/or otherwise stored by all browser programs/applications that may operate on the example computing device 100.

In the event that the cookie manager discovers a cookie associated with one of the household panelist members, the possibility exists that a separate browser also has a cookie of the same type for the same user. For example, the user may have used a first browser to access Facebook® at a first time, but may have more recently used a second browser on the computing device 100 at a second time to access Facebook®. As such, both browsers will have a cookie of type c_user and the corresponding user service identifier. To identify which cookie is the most recently created and/or otherwise modified, the example duplicate identifier 208 invokes the example application storage interface 204 to search for other cookies that use the "c_user" nomenclature. Additionally, the example cookie temporal analyzer 210 compares cookies to determine which one is most recent (e.g., via a creation timestamp, via a modification timestamp, etc.).

In some examples, a first user (panelist) of the example computing device 100 logs onto a website that provides cookies such as Facebook® and, some time later, walks away from the computing device 100 without logging out. As described above, the cookie tag of type "c_user" is deleted from a browser cookie storage when a user explicitly selects a log-out option from the (e.g., Facebook®) interface. If a second user (panelist) of the example computing device 100 logs into the same website (e.g., Facebook®) using the same browser that had been used by the first user, then the cookie tag of type "c_user" is replaced with the service identifier associated with the second user. On the other hand, if the second user of the example computing device 100 logs into the webpage (e.g., Facebook®) using a different browser than the one used by the first user, then the cookie tag of type "c_user" for the first browser remains in the platform memory 108, and a new cookie tag of type "c_user" for the second browser is created and stored in the platform memory 108.

To determine which user is likely the current user, the example cookie manager 206 identifies both cookie tags of type "c_user," and invokes the example cookie temporal analyzer 210 to determine which one is more recent. When the most recent user is identified, based on the corresponding service identifier associated with the most recent cookie, the example activity associator 212 associates subsequent behavior on the platform 100 with the most recent user.

In other examples, a first user of the computing device 100 (e.g., John) may log into a web-based service, such as Facebook®, and leave the computing device 100 without logging out. If a second user begins to use the computing device 100 and logs into any other website (e.g., the same or different type of web-based service) that uses cookies, then the cookie associated with the first user remains stored on the example platform memory 108. For example, the second user (e.g., Mary) may log on to her e-mail account (e.g., having a cookie tag nomenclature "xyz") using the same, or a different browser. As such, the example platform memory has one cookie of a type associated with John's Facebook® account, and another cookie of a type associated with Mary's e-mail account. The example cookie temporal analyzer 210 determines which of the two (or more) cookies is more recent and associates the user of the more recent cookie with current usage of the computing platform 100.

While an example manner of implementing the cookie user identifier 122 of FIG. 1 has been illustrated in FIGS. 2 and 3, one or more of the elements, processes and/or devices illustrated in FIGS. 1-3 may be combined, divided, rearranged, omitted, eliminated and/or implemented in any other way. Further, the example first browser 102, the example second browser 104, the example third browser, the example first browser cookie directory 110, the example second browser cookie directory 112, the example third browser cookie directory 114, the example cookie user identifier 122, the example platform analyzer 202, the example application storage interface 204, the example cookie manager 206, the example cookie database 207, the example duplicate identifier 208, the example cookie temporal analyzer 210, the example activity associator 212, the example timer 214, the example cookie change monitor 216, and/or the example cookie table 300 of FIGS. 1-3 may be implemented by hardware, software, firmware and/or any combination of hardware, software and/or firmware. Thus, for example, any of the example first browser 102, the example second browser 104, the example third browser, the example first browser cookie directory 110, the example second browser cookie directory 112, the example third browser cookie directory 114, the example cookie user identifier 122, the example platform analyzer 202, the example application storage interface 204, the example cookie manager 206, the example cookie database 207, the example duplicate identifier 208, the example cookie temporal analyzer 210, the example activity associator 212, the example timer 214, the example cookie change monitor 216, and/or the example cookie table 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example first browser 102, the example second browser 104, the example third browser, the example first browser cookie directory 110, the example second browser cookie directory 112, the example third browser cookie directory 114, the example cookie user identifier 122, the example platform analyzer 202, the example application storage interface 204, the example cookie manager 206, the example cookie database 207, the example duplicate identifier 208, the example cookie temporal analyzer 210, the example activity associator 212, the example timer 214, the example cookie change monitor 216, and/or the example cookie table 300 are hereby expressly defined to include a tangible computer readable medium such as a memory, DVD, CD, Blu-ray, etc. storing the software and/or firmware. Further still, the example cookie user identifier 122 of FIGS. 1 and 2 may include one or more elements, processes and/or devices in addition to, or instead of, those illustrated in FIGS. 1-3, and/or may include more than one of any or all of the illustrated elements, processes and devices.

Figure 4:
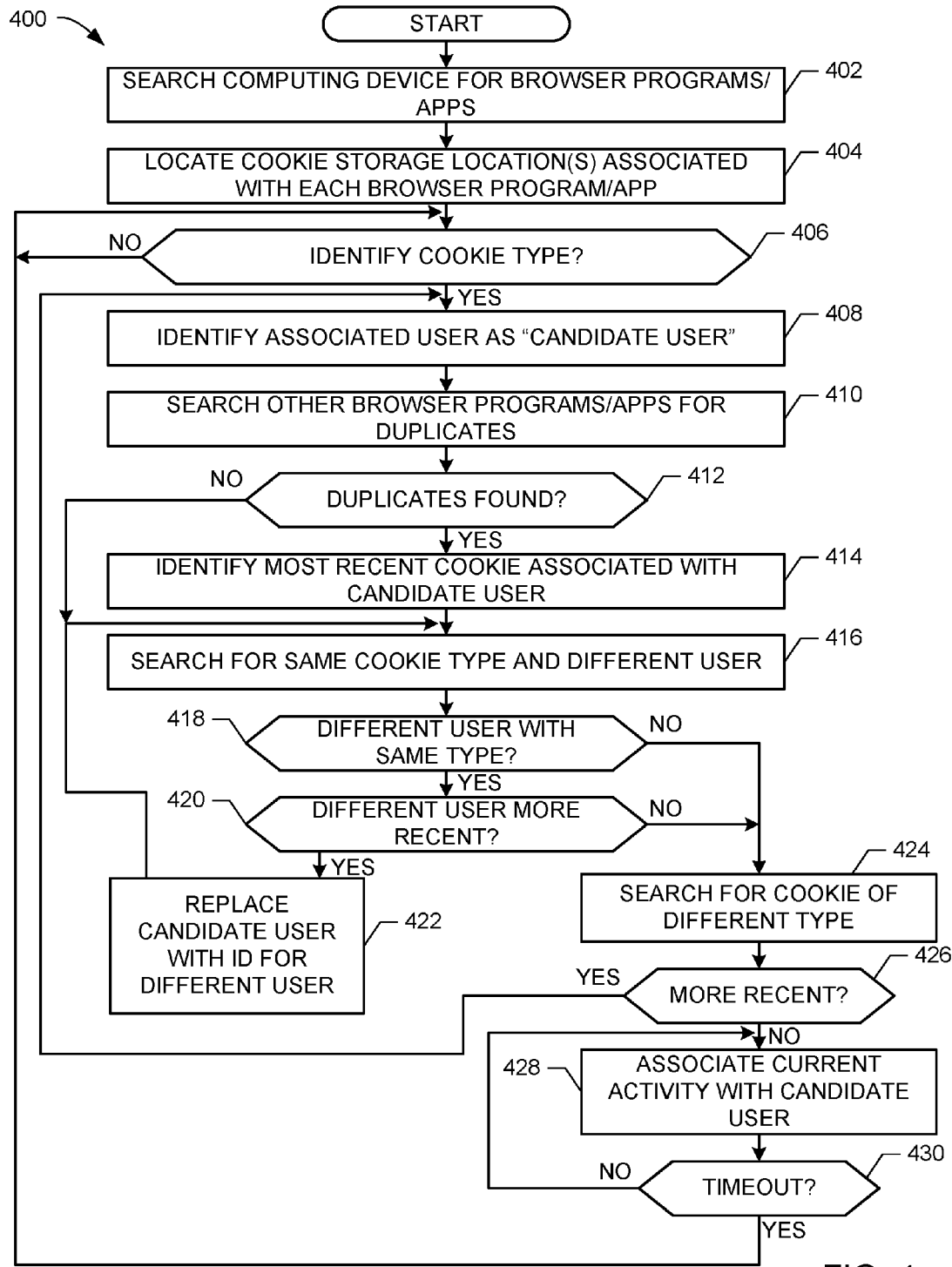
FIGS. 4 and 5 are flowcharts representative of example machine readable instructions which may be executed to identify session users with cookie information.

A flowchart representative of example machine readable instructions for implementing the cookie user identifier 122 of FIGS. 1 and 2 is shown in FIG. 4. A flowchart indicative of example machine readable instructions for identifying session users with cookies is further shown in FIG. 5. In these examples, the machine readable instructions comprise a program for execution by a processor such as the processor 612 shown in the example computer 600 discussed below in connection with FIG. 6. The program may be embodied in software stored on a tangible computer readable medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example cookie user identifier 122 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4 and 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program 400 of FIG. 4 begins at block 402, in which the example platform analyzer 202 searches the example computing device 100 for browser programs and/or applications. For example, a personal computer and/or laptop may use Google® Chrome®, Microsoft® Internet Explorer® and/or Mozilla Firefox®. In other examples, an Apple®-based product may use the Safari® browser. In still other examples, a wireless telephone may use an Android® browser, Opera®, Dolphin®, etc. The example platform analyzer 202 may locate one or more browser programs/applications by searching a program library, a file structure and/or by analyzing an operating system registry. For each browser program/application identified by the example platform analyzer 202, the example application storage interface 204 identifies one or more storage locations associated with and/or otherwise used by each browser program/application (block 404).

The example cookie manager invokes the example application storage interface 204 to search the platform memory 108 of the platform and identify a cookie of a first type (block 406). For example, because Facebook® web services reflect a relatively large portion of session activity during computing device session(s), a search for cookies having the "c_user" tag may be assigned a high priority (e.g., preferred first). In some examples, the example cookie manager may direct the application storage interface 204 to search the platform memory 108 for one or more additional or alternate cookie tag nomenclature(s). If the example cookie manager 206 identifies a cookie of a known type (block 406), it determines an associated user identity via a lookup of the example service ID column 306 of the cookie table 300 (block 408). The identified user is associated with a candidate user of the computing device 100. However, the possibility exists that the identified user invokes more than one browser to gain access to the web service associated with the persistent cookie. As such, the cookie identified might not be the most recently generated cookie on the computing device 100. To determine whether the identified cookie associated with the candidate user is the most current, the duplicate identifier 208 invokes the storage interface 204 to search memory locations associated with one or more other browsers/apps that may be installed on the computing device 100 (block 410).

If a duplicate is found (block 412), then the cookie temporal analyzer 210 identifies which cookie is most recent (block 414). The example cookie temporal analyzer 210 may locate a timestamp of the cookies, a date of creation indicator of the cookies, and/or a date of modification of the cookies to determine which cookie associated with the candidate user is most recent. The most recent cookie and corresponding user is associated with the candidate user of the computing device 100 (block 414).

In some examples, a second user may use the computing device 100 to utilize the same web-based service as a prior user, but the web-based service may have been accessed via a separate browser program/app than the first user. To make sure that a second user (e.g., a user different from the previously identified candidate user) is not the true candidate user, the example cookie manager 206 searches for the same cookie type (e.g., a cookie using a "c_user" tag) associated with other user(s) in memory locations associated with other browser programs/apps that may be installed on the computing device 100 (block 416). If a second (alternate) user associated with the same cookie type is identified (block 418), the example cookie temporal analyzer 210 determines which cookie is more recent (block 420). If the second cookie is more recent (block 420), then the household user associated with the alternate service ID is associated with the candidate user, effectively replacing the previously determined candidate user (block 422).

On the other hand, if the second (alternate) user associated with the same cookie type is not more recent (block 420) (e.g., as determined by an indication from a modification date, a creation date and/or other timestamp), then the example application storage interface 204 searches the platform memory 108 for a cookie of an alternate type (block 424). For example, a separate web-based service may have been accessed by a household member of the computing device 100 that is more recent, such as a different social website, an e-mail website, a banking website, etc. If a separate cookie of an alternate type is identified that is more recent (block 426), then the example program 400 of FIG. 4 returns to block 408 to identify the corresponding user associated with the more recent cookie. On the other hand, if the example computing device 100 does not have any more cookies of alternate type(s) that are more recent (block 426), then the example activity associator 212 associates all browsing activity with the currently identified user (block 428).

In other examples, a current user of the example computing device 100 may walk away, and a different user may begin using the computing device 100. Additionally, because the prior user may not have logged off one or more web-based services that employ cookies, the example timer 214 manages a timeout period (block 430). If the timeout period does not occur, then the example activity associator continues to associate current activity on the computing device 100 with the currently identified user. On the other hand, when the timeout period expires (block 430), then the program 400 returns to block 406 to search the platform memory 108 again for one or more other cookies that may result from one or more other web-based services invoked by the same (current) user, or a different user of the panelist household.

Figure 5:
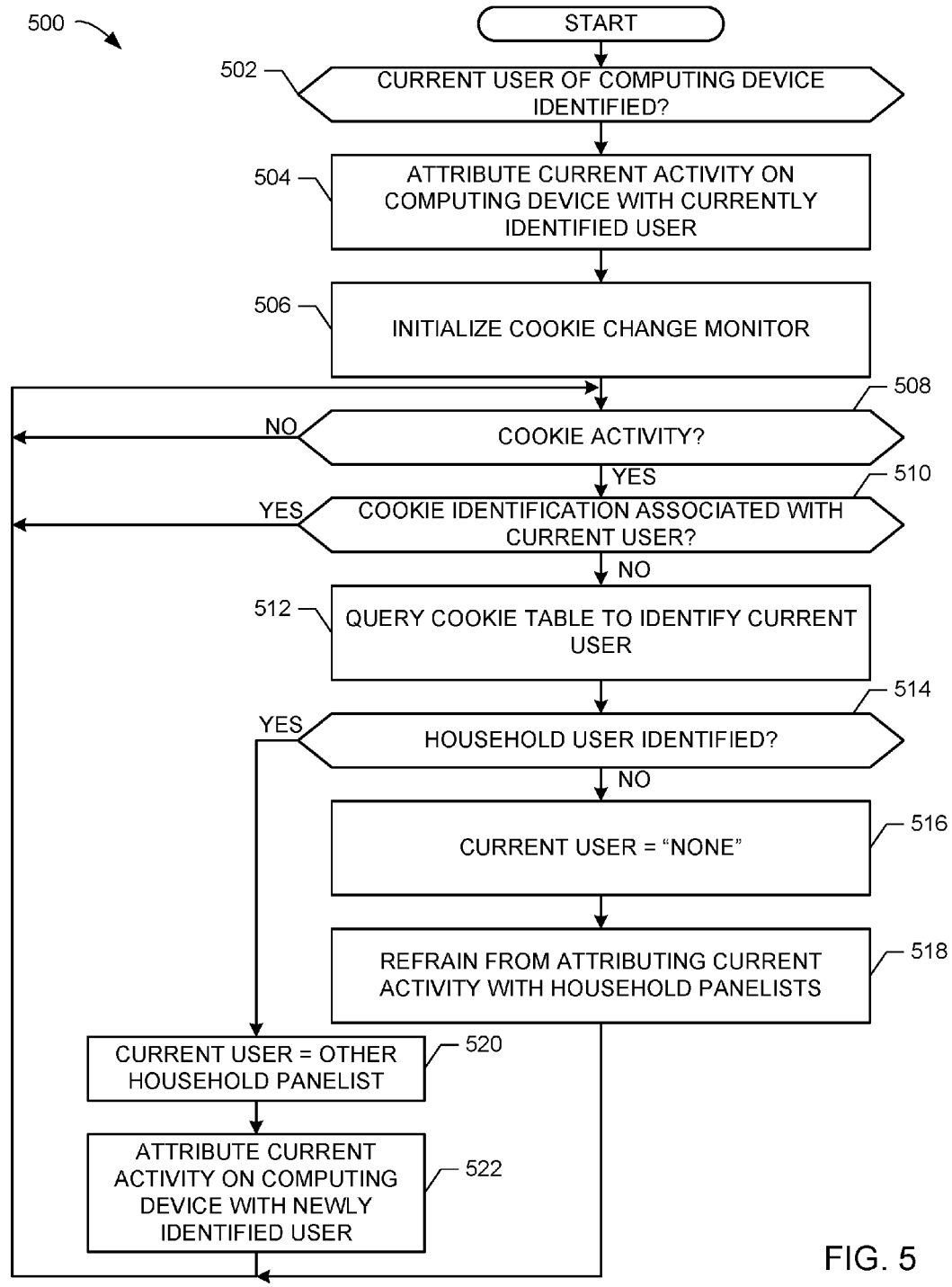

FIG. 5 is a flowchart representative of an example program 500 which may be executed to identify session users with cookie information. The program 500 of FIG. 5 begins at block 502, in which the activity associator 212 determines whether a current user of the computing device 100 has been identified. For example, a user (panelist) may have explicitly identified himself or herself before or during use of the computing device 100 via a PeopleMeter®, a dialog prompt and/or other response to an identification request. The PeopleMeter® may, for example, contain an array of selectable buttons or other user interface to allow a household member to indicate their identity prior or during use of the computing device 100. In response to receiving an indication of a household user (block 502), the example activity associator 212 attributes current activity with the computing device 100 to the currently identified user (block 504). The example cookie user identifier 122 invokes the example cookie change monitor 216 to monitor for any changes to known cookie types that may be stored on the platform memory 108, such as cookies stored in the example first browser cookie directory 110, the example second browser cookie directory 112, and/or the example third browser cookie directory 114 (block 506). Changes to one or more known cookie types (e.g., cookies having a tag nomenclature "c_user") may include, but are not limited to added cookies, deleted cookies, cookie timestamp changes, cookie field value changes, etc. Additionally, such changes may occur in association with any of the browser applications/programs installed and/or otherwise executing on the example computing platform 100. As described above, monitoring cookie change activity with respect to any browser application/program of the computing device 100 facilitates detection of some household users accessing web-based services on a first browser, while other household members utilize the same web-based services via another browser. In such example circumstances, both cookies may be simultaneously resident on the platform memory 108.

In the illustrated example of FIG. 5, if the cookie change monitor 216 does not identify changes to one or more known cookie types (block 508), then the program 500 waits. Otherwise, in response to the example cookie change monitor 216 detecting change(s) to one or more known cookie types (block 508), the example cookie manager 206 determines whether a change to a known cookie type is associated with the currently identified household panelist member (block 510). In some examples, the cookie manager 206 parses and/or otherwise examines the content(s) of cookies stored in the platform memory 108 for an indication of a panelist member, such as a panelist username, a numeric value associated uniquely with the panelist, and/or an alphanumeric value associated uniquely with the panelist. As described above, the example cookie table 300 includes a service ID column 306 for each respective household member. If a service ID value associated with a household member is detected by the example cookie manager 206, then control returns to block 508 where the example cookie change monitor 216 continues to monitor for changes to cookies stored on the platform memory 108. For example, the current user of the computing device 100 may have just accessed a social website (e.g., Twitter®) or an e-mail account (e.g., Google®).

On the other hand, if cookie activity is detected by the example cookie change monitor 216 (block 508), and the changes are not affiliated with the currently identified user (block 510), then the cookie manager 206 queries the cookie table 300 to find a match (block 512). In the event a current household member cannot be identified via a match in the example service ID column 306 of the cookie table 300 (block 514) (e.g., when the cookie is devoid of an indication of one or more panelist member(s)), then a guest may be using the computing device 100. For example, one or more of the household panelist members may have one or more guests in their home that wish to check their e-mail account(s) and/or check their social networking status(es). As such, the example activity associator 212 identifies the current user as "none" (or similar) (block 516), and refrains and/or otherwise stops logging activity of the computer platform 100 with one or more household member(s) (block 518). Control then returns to block 508, where the example cookie change monitor 216 monitors the example platform memory 108 for changes to one or more cookies.

In the event that the example cookie change monitor 216 identifies change activity (block 508), determines such cookie activity is not associated with the currently identified user (block 510) (e.g., a user that previously indicated their identity via a PeopleMeter® button press), and identifies that the cookie change is associated with a different household panelist member (block 514), then the example activity associator 212 associates the current activity with the other household panelist member (block 520). For example, the other household panelist member may be identified based on matching information from the service ID column 306 of the example cookie table 300. The example activity associator 212 associates activity on the example computing device 100 with the newly identified household member (block 522). Control returns to block 508 to allow the example cookie change monitor 216 to identify one or more changes to new and/or existing cookies stored on the example platform memory 108.

Figure 6:
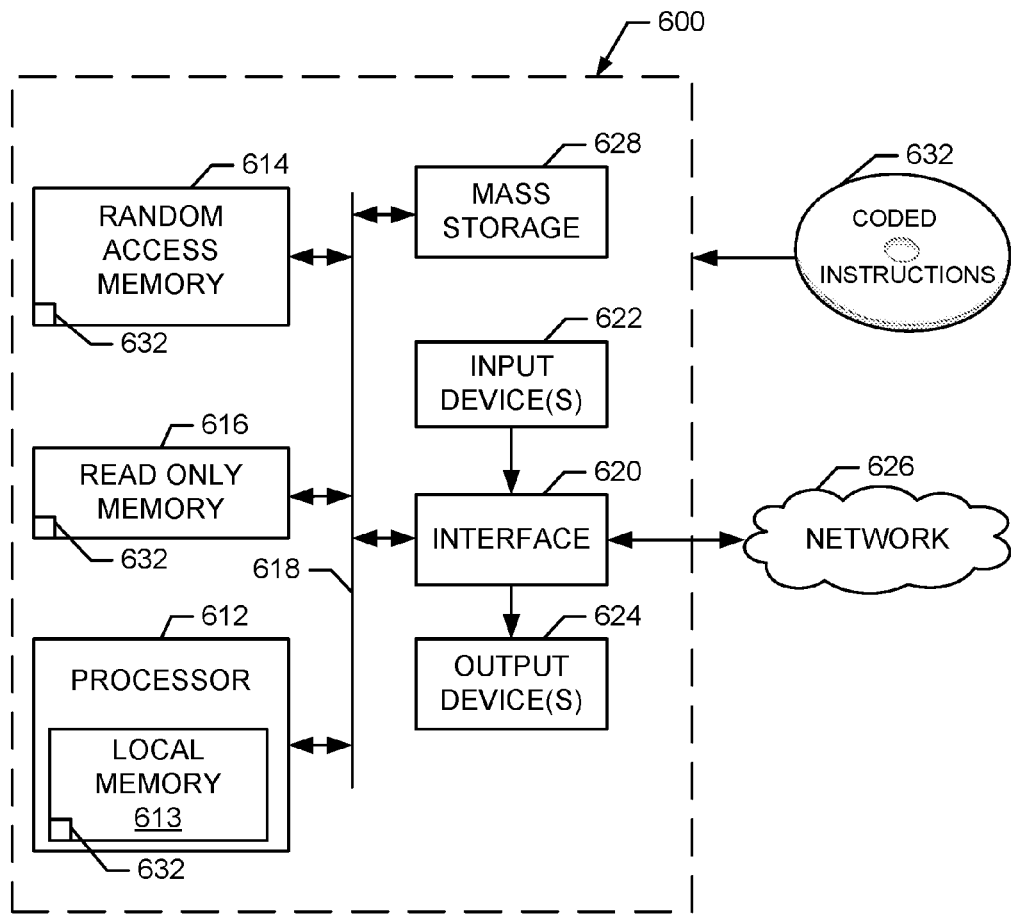
FIG. 6 is a block diagram of an example system that may execute the example machine readable instructions of FIGS. 4 and 5 to implement the example cookie user identifier of FIGS. 1 and 2, and/or to build the example table of FIG. 3.

FIG. 6 is a block diagram of an example computer 600 capable of executing the instructions of FIGS. 4 and 5 to implement the cookie user identifier 122 of FIGS. 1-3. The computer 600 can be, for example, a server, a personal computer, a mobile phone (e.g., a cell phone), a personal digital assistant (PDA), a television, an Internet appliance, a gaming console, a set top box, or any other type of computing device that stores a cookie.

The system 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The computer 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication device, such as a modem or network interface card to facilitate exchange of data with external computers via a network 626 (e.g., an Ethernet connection, a digital subscriber line (DSL), a telephone line, coaxial cable, a cellular telephone system, etc.).

The computer 600 also includes one or more mass storage devices 628 for storing software and data. Examples of such mass storage devices 628 include floppy disk drives, hard drive disks, compact disk drives and digital versatile disk (DVD) drives. The mass storage device 628 may implement the platform memory 108.

The coded instructions 632 of FIGS. 4 and 5 may be stored in the mass storage device 628, in the volatile memory 614, in the non-volatile memory 616, and/or on a removable storage medium such as a CD or DVD.

From the foregoing, it will be appreciated that disclosed example methods, systems, apparatus and articles of manufacture facilitate identification of session users by using cookie information associated with web-services used by household panelist members. By identifying cookies on a shared computing device, example methods, systems, apparatus and articles of manufacture disclosed herein determine the most likely user within the household that is using the computing device, and makes such identification in a manner that is non-intrusive to the panelist member. Rather than inundating the panelist member with one or more prompts that force selection of their identity, example methods, apparatus, systems and articles of manufacture disclosed herein generate a list of known web-service cookies and associated user identification information for each household member. The cookie having the most recent indication of modification, such as a timestamp, indicates one of many users in the household that is most likely using the computing device.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to identify a current user of a computing device among a plurality of different users, the method comprising:
    identifying, by executing an instruction with a processor, a most recently used cookie based on a comparison of timestamps associated with a plurality of cookies;
    comparing, by executing an instruction with the processor, an identifier of the most recently used cookie to a cookie table, the cookie table associating cookies with the plurality of different users; and
    when the identifier of the most recently used cookie is associated with one of the plurality of different users, associating, by executing an instruction with the processor, subsequent usage activity of the computing device with the one of the plurality of different users.

2. The method as defined in claim 1, wherein when the identifier of the most recently used cookie is not associated with any of the plurality of different users, refraining from associating the subsequent usage activity of the computing device with any of the plurality of different users.

3. The method as defined in claim 1, wherein the subsequent usage activity of the computing device is browsing activity that is not associated with the most recently used cookie.

4. The method as defined in claim 1, wherein the associating of the subsequent usage activity occurs until a timeout period expires.

5. The method as defined in claim 1, wherein the most recently used cookie is associated with at least one of a social networking service, an email service, or a banking service.

6. The method as defined in claim 1, wherein the plurality of cookies are from a first storage location associated with a first browser and a second storage location associated with a second browser.

7. The method as defined in claim 1, wherein the cookie table is stored on the computing device.

8. An apparatus to identify a current user of a computing device among a plurality of different users, the apparatus comprising:
    a cookie manager to:
        identify a most recently used cookie based on a comparison of timestamps associated with a plurality of cookies; and
        compare an identifier of the most recently used cookie to a cookie table, the cookie table associating cookies with the plurality of different users; and
    an activity associator to, when the identifier of the most recently used cookie is associated with one of the plurality of different users, associate subsequent usage activity of the computing device with the one of the plurality of different users, at least one of the cookie manager or the activity associator implemented via a processor.

9. The apparatus as defined in claim 8, wherein the activity associator is to, when the identifier of the most recently used cookie is not associated with any of the plurality of different users, refrain from associating the subsequent usage activity of the computing device with any of the plurality of different users.

10. The apparatus as defined in claim 8, wherein the subsequent usage activity of the computing device is browsing activity that is not associated with the most recently used cookie.

11. The apparatus as defined in claim 8, wherein the activity associator is to associate the subsequent usage activity with the one of the plurality of different users until a timeout period expires.

12. The apparatus as defined in claim 8, wherein the most recently used cookie is associated with at least one of a social networking service, an email service, or a banking service.

13. The apparatus as defined in claim 8, wherein the plurality of cookies are from a first storage location associated with a first browser and a second storage location associated with a second browser.

14. The apparatus as defined in claim 8, wherein the cookie table is stored on the computing device.

15. A tangible computer readable storage medium comprising instructions to identify a current user of a computing device among a plurality of different users, the instructions, when executed, cause a machine to at least:
    identify a most recently used cookie based on a comparison of timestamps associated with a plurality of cookies;
    compare an identifier of the most recently used cookie to a cookie table, the cookie table associating cookies with the plurality of different users; and
    when the identifier of the most recently used cookie is associated with one of the plurality of different users, associate subsequent usage activity of the computing device with the one of the plurality of different users.

16. The storage medium as defined in claim 15, further including instructions that cause the machine to, when the identifier of the most recently used cookie is not associated with any of the plurality of different users, refrain from associating the subsequent usage activity of the computing device with any of the plurality of different users.

17. The storage medium as defined in claim 15, wherein the subsequent usage activity of the computing device is browsing activity that is not associated with the most recently used cookie.

18. The storage medium as defined in claim 15, wherein the associating of the subsequent usage activity occurs until a timeout period expires.

19. The storage medium as defined in claim 15, wherein the plurality of cookies are from a first storage location associated with a first browser and a second storage location associated with a second browser.

20. The storage medium as defined in claim 15, wherein the cookie table is stored on the computing device.

* * * * *